United States Patent [19]
Heggerud

[11] Patent Number: 5,651,638
[45] Date of Patent: Jul. 29, 1997

[54] METHOD AND APPARATUS FOR CONTROLLING THE POSITION AND OPERATION OF EQUIPMENT WITHIN A PIPELINE

[75] Inventor: Beverley Clarence Heggerud, Wetaskiwin, Canada

[73] Assignee: CRC-Evans Pipeline International, Inc., Houston, Tex.

[21] Appl. No.: 522,594

[22] Filed: Sep. 1, 1995

[51] Int. Cl.⁶ .................................................. F16L 1/00
[52] U.S. Cl. ........................... 405/154; 405/156; 324/326
[58] Field of Search ................................. 405/154, 157, 405/156; 324/326; 175/45

[56] References Cited

U.S. PATENT DOCUMENTS

| | | | |
|---|---|---|---|
| 2,521,745 | 9/1950 | Pope | 405/154 X |
| 3,653,050 | 3/1972 | Eggleston, Jr. | 405/157 X |
| 5,033,391 | 7/1991 | Watanabe | 104/23.2 |
| 5,150,989 | 9/1992 | Long, Jr. et al. | 405/154 X |
| 5,151,657 | 9/1992 | Tashjian | 324/326 |
| 5,200,704 | 4/1993 | Clark, Jr. et al. | 405/157 X |
| 5,322,653 | 6/1994 | Müller | 405/157 X |
| 5,425,367 | 6/1995 | Shapiro et al. | 324/326 X |
| 5,438,266 | 8/1995 | Tsang | 324/326 |
| 5,469,155 | 11/1995 | Archambeault et al. | 324/326 X |

*Primary Examiner*—William P. Neuder
*Attorney, Agent, or Firm*—Sidley & Austin

[57] ABSTRACT

Equipment is positioned within a pipeline for providing many functions related to the construction and operation of the pipeline. A mandrel is positioned within a segment of pipe for bending the pipe segment for use in fabricating the pipeline. It is important that equipment used within a pipeline, in many applications, be positioned at a correct longitudinal location within the pipeline. A electromagnetic frequency communication system is used which includes a transmit antenna external to the pipeline and a receiving antenna mounted on the equipment within the pipeline. In a preferred embodiment, these antennas are oriented at right angles to each other, with one being parallel to the axis of the pipeline and the other being perpendicular to the axis of the pipeline. The external apparatus transmits a periodic sinusoidal pulse. The internal apparatus receives the pulse and by examining the phase of the received pulse determines the relative position of the equipment within the pipeline with respect to the transmitting antenna. The same apparatus can further be used for providing data communication between the external and internal apparatus by comparing the phase of data pulses within predefined time segments to the phase of a leading, reference pulse.

11 Claims, 8 Drawing Sheets

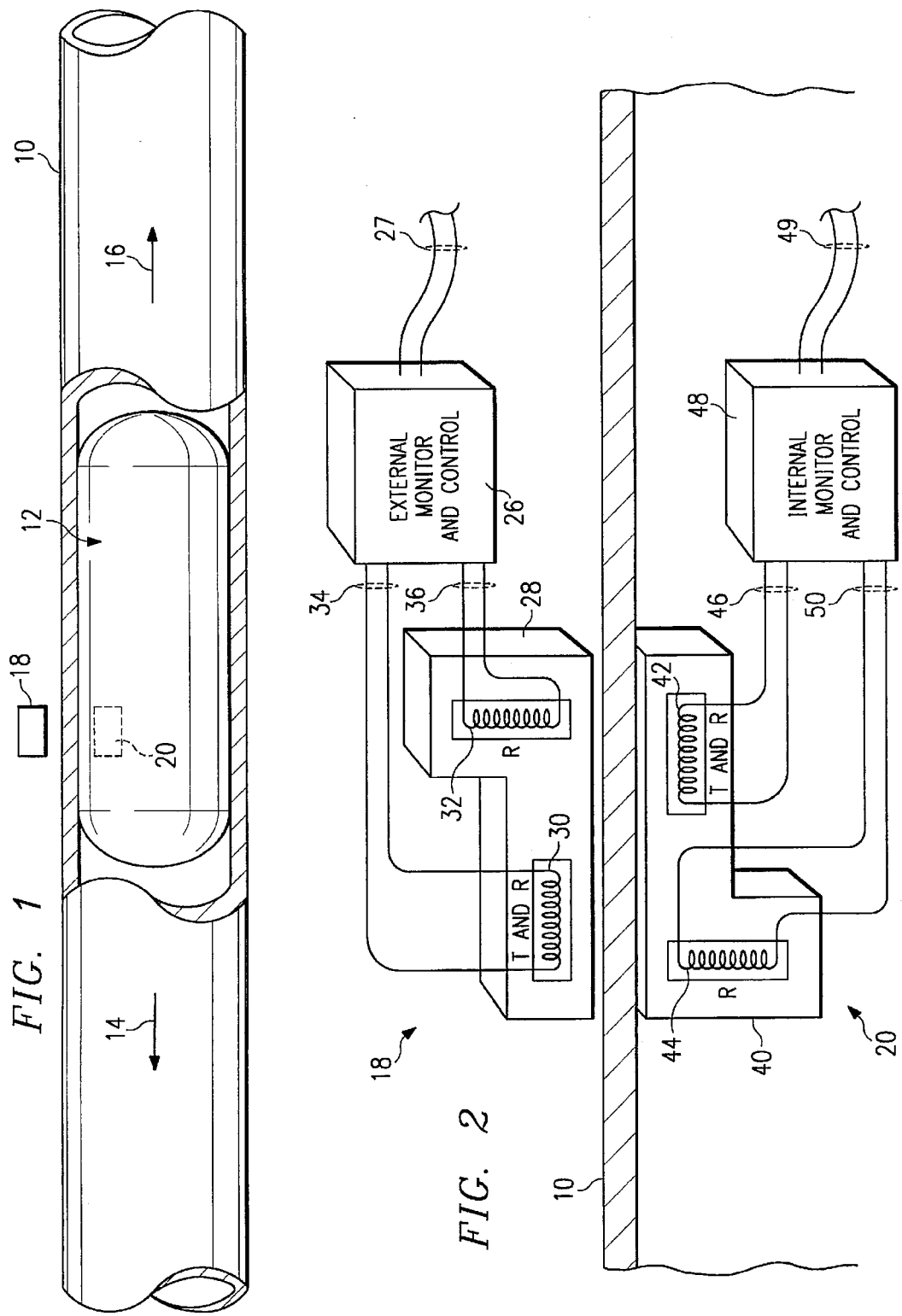

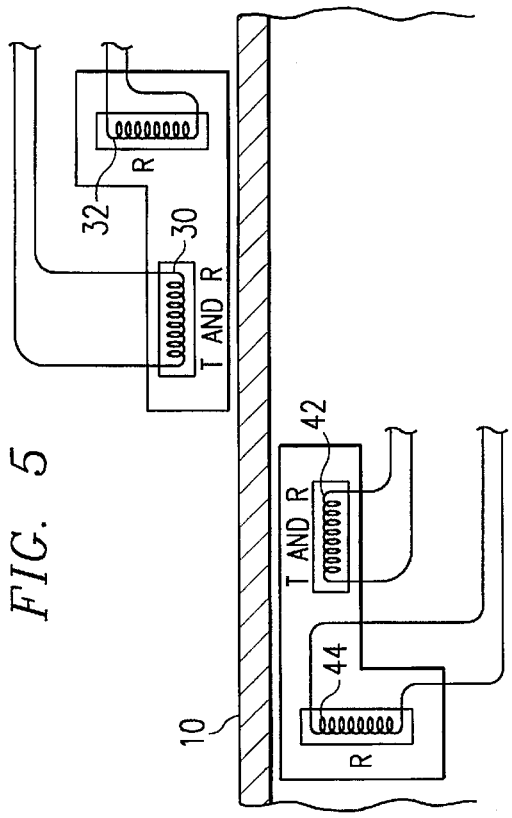
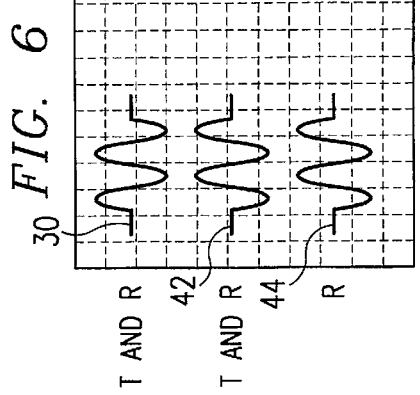
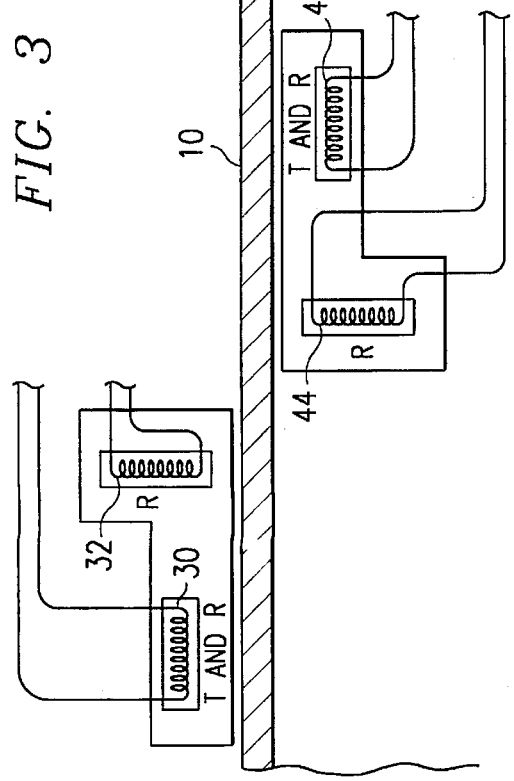
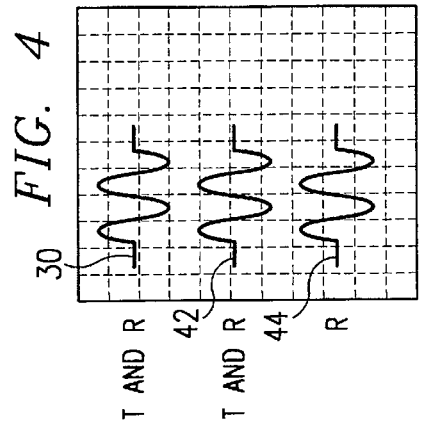

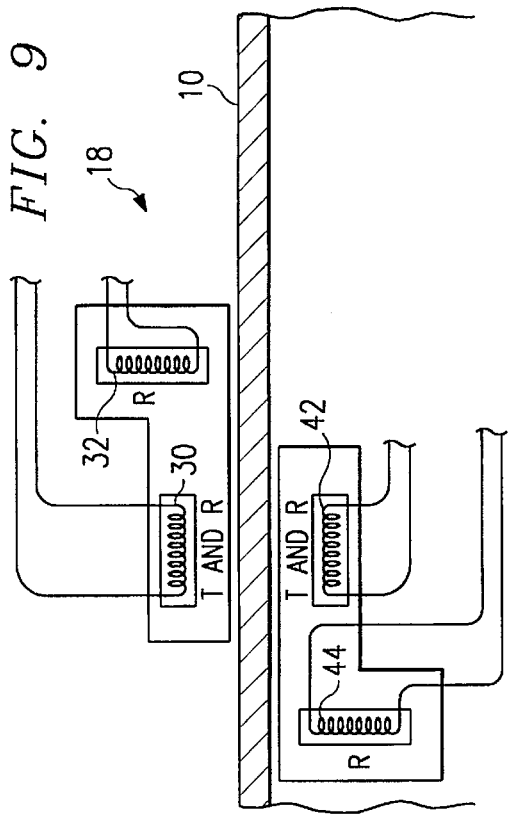
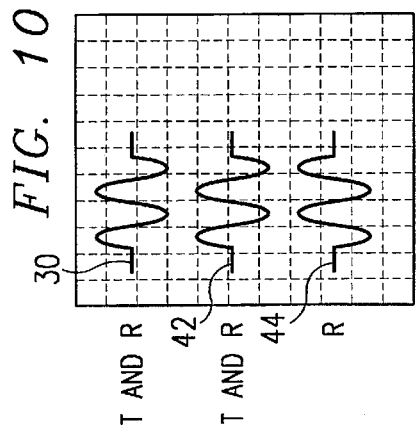
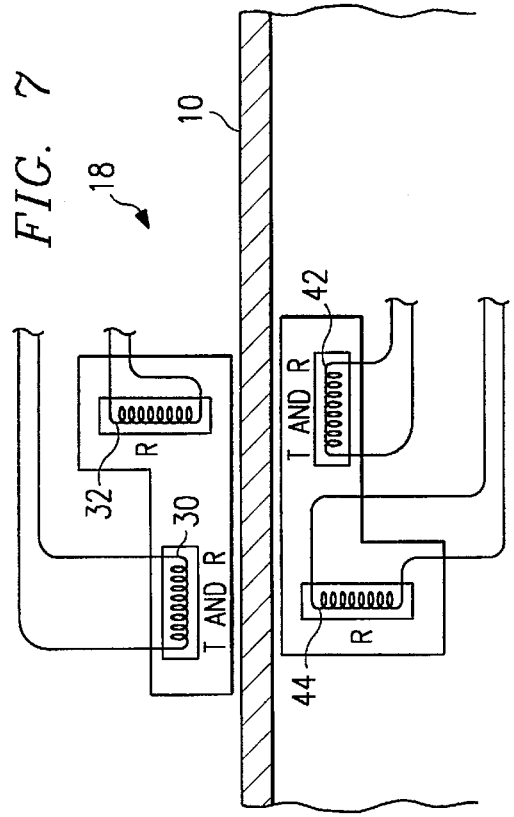
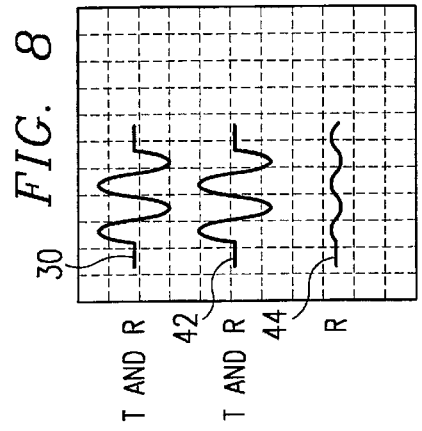

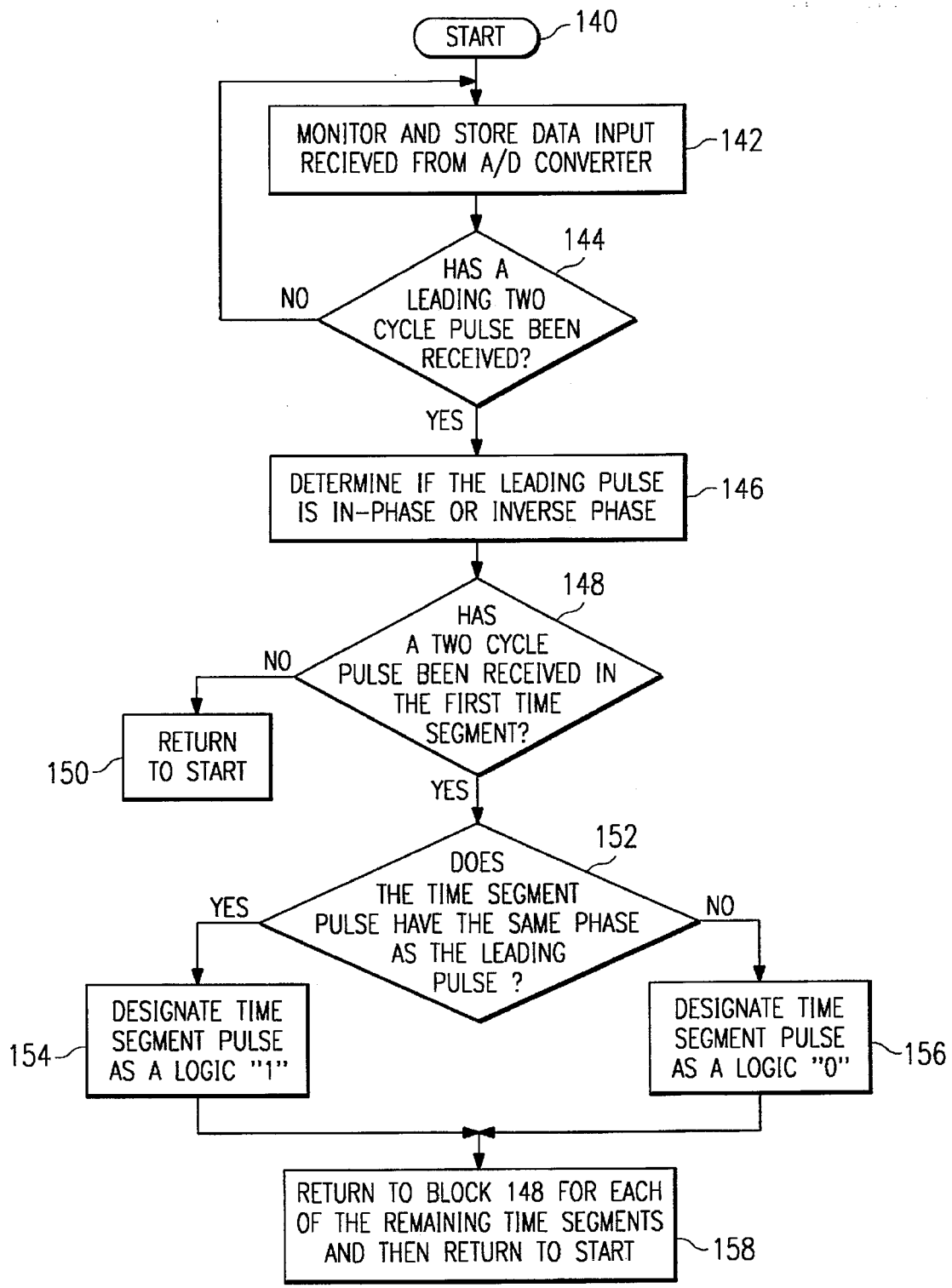

METHOD AND APPARATUS FOR CONTROLLING THE POSITION AND OPERATION OF EQUIPMENT WITHIN A PIPELINE

TECHNICAL FIELD OF THE INVENTION

The present invention pertains in general to remote electronic control apparatus and, more particularly, to such apparatus which communicates control and position information by use of electromagnetic waves which are transmitted through a metal barrier.

BACKGROUND OF THE INVENTION

The pipeline industry utilizes various types of equipment positioned inside a pipe or pipeline for a number of purposes, including welding, bending and inspection of pipe integrity. Such equipment can include pipe bending mandrels to assist in bending of a pipe, X-ray and gamma-ray units used for non-destructive testing of field girth welds during pipeline construction, and other equipment used to facilitate maintenance and repairs such as video cameras for pipe inspection and plug-type pigs for pipeline shutdown and evaluation. The equipment can be moved to different locations inside a pipeline on a device which is commonly referred to as a pipeline pig.

Typically, an operator controls the movement of equipment, such as a mandrel, inside the pipe using a reach rod. The reach rod is connected to the equipment and extends out the open end of the pipeline. An operator positioned near the opening of the pipe controls the positioning and functioning of the equipment through the reach rod. In order to position the piece of equipment within the pipeline at the appropriate location, the equipment inside the pipeline typically includes a transmitter which transmits an electromagnetic signal from inside the pipe to outside the pipe. Low frequency transmitters which are used to track pipeline pigs and equipment are well known in the art. However, present systems transmit the electromagnetic signals from inside the pipe to a receiver located at a point outside the pipe. The location of the equipment on the pipeline pig is then determined with reference to the receiver. The operator can also position the equipment, by use of the reach rod, at the appropriate location. Once the equipment is in the correct location in a pipe, the operator can use control lines that extend through the reach rod to control the functioning of the equipment as required.

Present systems used for locating equipment inside a pipe and controlling the functioning of this equipment have disadvantages which include the increased expense associated with using and maintaining the reach rod. Further, present systems require that the operator of the equipment be located near the point where the reach rod enters the pipe. Another drawback of these reach rod systems is the limited length of travel of this equipment within the pipe as determined by the length of the reach rod.

SUMMARY OF THE INVENTION

A selected embodiment of the present invention is an apparatus for determining relative position of equipment within a pipeline. A transmitter is provided with external apparatus to the pipeline and the equipment within the pipeline is to be positioned at a location relative to the external transmitter. The external transmitter includes an elongate coil transmit antenna which is to be positioned proximate the outer surface of the pipeline and parallel to the axis of the pipeline. A transmitter is provided which transmits a periodic sinusoidal pulse. Receiving apparatus is provided with the equipment within the pipeline. The receiving apparatus includes an elongate coil receive antenna which is positioned proximate the inner surface of the pipeline and is oriented perpendicular to the axis of the pipeline. A receiver is connected to the receive antenna for determining the phase of the received pulse signal. The determined phase of the received pulse signal is used for positioning the equipment within the pipeline and determining when the equipment is at a desired relative location with respect to the transmit antenna.

A further aspect of the present invention is a method for providing data communication between external apparatus to a pipeline and internal apparatus within a pipeline. A reference sinusoidal pulse is periodically transmitted by a transmitter which comprises a part of the external apparatus. The pulse defines a time window which includes a plurality of time segments. The external apparatus transmits a data sinusoidal pulse which has the same or inverse-phase to that of the reference pulse during one or more of the time segments. The selected phase for the data sinusoidal pulse defines a logic state for communication between the external and internal apparatus. The transmitted pulses are received at a receive antenna which comprises a part of the internal apparatus located within the pipeline. Within the internal apparatus, the phase of the received data pulses is compared to the phase of the received reference pulse. The data pulses that have the same phase as the reference pulse are designated to have a first logic state and the data pulses then have a different phase that of the reference pulse are designated to have a second logic state thereby providing data communications between the external and internal apparatus.

BRIEF DESCRIPTION OF THE DRAWINGS

For a more complete understanding of the present invention and the advantages thereof, reference is now made to the following description taken in conjunction with the accompanying drawings in which:

FIG. 1 is a partially cutaway view of a segment of a pipeline which has an internal mandrel which is used in the bending of a pipeline segment and further shows control apparatus which includes transmitters and receivers as implemented with the present invention;

FIG. 2 is a schematic illustration of monitoring and control units together with the antennas used for positioning of equipment within a pipeline and for communication between the interior and exterior of the pipeline;

FIG. 3 is a schematic illustration of antenna locations for determining position of equipment within a pipeline;

FIG. 4 is a waveform representation of the signals related to the antennas illustrated in FIG. 3;

FIG. 5 is a schematic illustration of antenna locations for determining position of equipment within a pipeline;

FIG. 6 is a waveform representation of signals which are related to the antenna configuration shown in FIG. 5;

FIG. 7 is a schematic illustration of antenna locations wherein the external T&R antenna is aligned with the internal R antenna;

FIG. 8 is a set of waveforms related to the physical antenna configuration shown in FIG. 7;

FIG. 9 is a configuration of antennas wherein the external T&R antenna is aligned with the internal T&R antenna;

FIG. 10 is a set of waveforms related to the physical antenna configuration shown in FIG. 9;

FIG. 16 is a flow diagram describing receipt of data by one of the two control apparatus.

DETAILED DESCRIPTION

Figure 11:
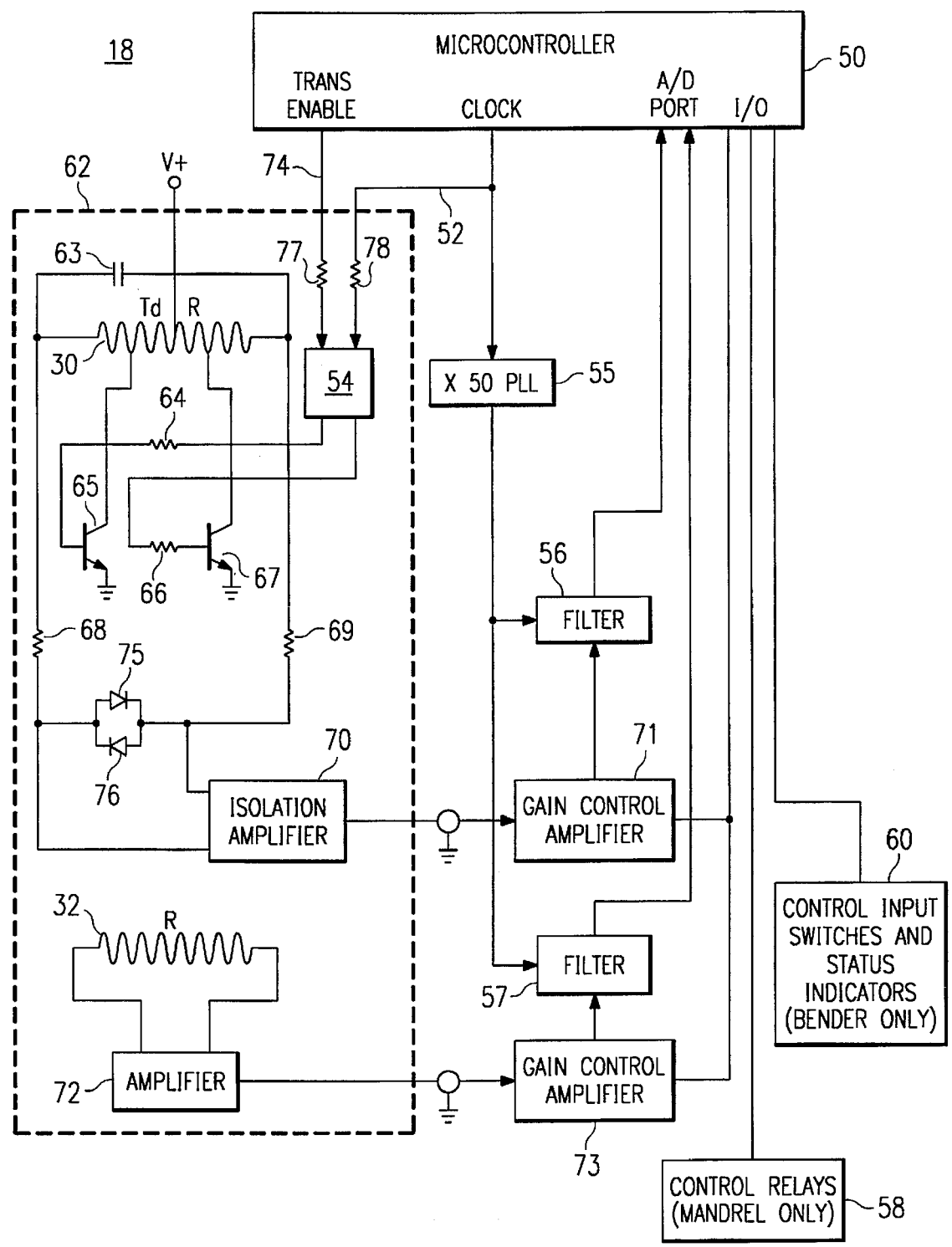
FIG. 11 is a block and schematic diagram for each of the external and internal monitor and control units shown in FIG. 2.

Referring to FIG. 1, there is shown a segment of a pipeline 10 into which has been placed a mandrel 12 which is positioned to a specified location and then expanded under pressure so that the segment of pipeline 10 can be bent and maintain smooth walls. The mandrel 12 is well known in the technology of pipeline construction. The pipeline 10 is made up of pipe segments which are typically 40 or 80 feet long. It is important to accurately position the mandrel 12 at the correct location within the segment of pipeline 10. A typical mandrel 12 is provided with a motor that permits the mandrel 12 to move in the pipeline 10 in either of the directions indicated by the arrows 14 and 16. The present invention is directed toward an apparatus which can accurately locate the mandrel 12, as well as any other type of internal pipeline apparatus, at a specific location within the pipeline 10.

The invention includes an external control apparatus 18 and an internal control apparatus 20. In general, the present invention provides that the external control apparatus 18 is located at the longitudinal position where it is desired to internally locate the mandrel 12 which is equipped with the internal control apparatus 20. The internal control apparatus 20 produces control signals that are provided to a drive motor of the mandrel 12 to move it as required in the directions of the arrows 14 or 16. By use of the present invention, the mandrel 12 can be inserted into the pipeline 10 and then by use of the apparatus 18 and 20, the mandrel 12 can be positioned at the desired position within the pipeline 10. Further, the apparatus 18 and 20 serves to provide communication between an external device, such as a pipe bending machine, and internal equipment, in this example the mandrel 12. Thus, the present invention provides a method and apparatus for accurately positioning an item of equipment, such as a pipe bending mandrel, within a pipeline and further for providing data communications in both directions between the equipment within the pipeline and equipment on the outside of the pipeline.

Referring now to FIG. 2, there is shown the pipeline 10 together with the external control apparatus 18 and the internal control apparatus 20, both shown in greater detail. The wall of the pipeline 10 is shown in section. This wall typically is made of steel and has a thickness of ¼–¾ inch.

The external control apparatus 18 includes an external monitor and control 26 and an antenna housing 28 which has included therein two antennas. A transmit and receive (T&R) antenna 30 and a receive (R) antenna 32 are mounted in the housing 28. The antennas 30 and 32 are mounted at right angles to each other. In operation, the housing 28 is held at such a position that the antenna 30 has its axis parallel to that of the axis of the pipeline 10 and the axis of the antenna 32 is perpendicular to the axis of the pipeline 10. The antennas 30 and 32 are preferably coils which have, for example, a length of 5½ inches and a diameter of, for example, one inch. The T&R antenna 30 is connected via lines 34 to the control 26 and the R antenna 32 is connected via lines 36 to the control 26.

The internal control apparatus 20, which is located during operation within the pipeline 10, includes an antenna housing 40 which has therein a T&R antenna 42 and an R antenna 44. The axis of antenna 42 is parallel to that of the pipeline 10 and the axis of the antenna 44 is perpendicular to the axis of the pipeline 10. These are the positions of the antennas 42 and 44 when in operation. The T&R antenna 42 is connected via lines 46 to an internal monitor and control 48. The R antenna 44 is connected via lines 50 to the internal monitor and control 48.

The external control apparatus 18 is connected, in a selected embodiment, to a pipe bending machine of the type shown in U.S. Pat. No. 5,123,272, which is incorporated herein by reference. This type of bending machine operates in conjunction with an internal mandrel, such as mandrel 12 shown in FIG. 1. The internal control apparatus is connected to the control of the mandrel 12. A representative embodiment of the mandrel 12 is described in U.S. Pat. No. 3,747,394 (issued Jul. 24, 1973) and U.S. Pat. No. 4,493,203 (issued Jan. 15, 1985), both of which are incorporated herein by reference.

The coils 42 and 44 are the same size as coils 30 and 32.

The control 26 is connected to a cable 27 that provides electrical signals to and from the external apparatus, such as a pipe bending machine. The internal control 48 is connected via a cable 49 to the equipment located within the pipeline 10, such as the mandrel 12 to receive data and send commands between the control 48 and the mandrel control circuitry.

In operation, a pipe bending machine (not shown) has the antennas of the external control apparatus 18 at a fixed position. A section of pipe for incorporation into the pipeline 10 is positioned within the pipe bending machine for a bend to be made at a selected location in the pipe section. The mandrel 12, which has the internal control apparatus 20 mounted thereto, is moved by its drive motor into the pipeline 10 to the approximate vicinity needed for its operation. As further described below, the external control apparatus 18 generates a sinusoidal pulse signal which is received by the antenna 44 of the internal control apparatus 20 as the mandrel moves through the pipeline 10. If the apparatus 20 is located to the right of the apparatus 18, a given polarity of signal will be received in the antenna 44 and detected by the control 48. As the mandrel 12 moves to the left, in the direction of arrow 14, the amplitude of the signal decreases until it reaches approximately a null condition when the center axis of the antenna 44 is at the center of the transmit and receive antenna 30. If the antenna 44 should move further to the left, in the direction of arrow 14, the signal received will increase in amplitude, and will also have a reverse polarity. This change in polarity is detected by the control 48 which generates a control signal that is directed to the drive motor of the mandrel 12 which then propels the mandrel in the direction 16 until the proper null position is found. This operation is described in further detail below.

Referring to FIGS. 3 and 4, there is shown schematically the pipeline 10 together with the antennas 30 and 32 of the external control apparatus 18 and the antennas 42 and 44 of the internal control apparatus 20. FIG. 4 shows waveforms representative of the signals in the T&R antenna 30, the T&R antenna 42 and the R antenna 44. The usual operation for providing positioning of the mandrel 12 within the pipeline 10 is to have the external control apparatus 18 generate a sinusoidal pulse which is transmitted through the antenna 30. This pulse is preferably at a frequency of 22 Hz and has a duration of two cycles. This is shown, in abbreviated form, as the upper waveform in FIG. 4. This pulse, for this example, has four cycles shown and has an initial rising edge for the first cycle. This will hereafter be referred to as an "in-phase" signal. A further signal will be referred to as the "inverse-phase" signal. The inverse-phase signal has a phase which is inverse to that of the in-phase signal. The two cycles of pulse is preferably followed by a no signal period which has a time approximately equal to that of three cycles. This no signal period allows transmit signals to stabilize.

When the bender and mandrel are substantially out of alignment, the control system goes into a tracking mode only. This mode is used until the bender and mandrel have come into substantial alignment. After this has occurred, the control system changes to a data communication mode, which is described in further detail below.

Further referring to FIGS. 3 and 4, when the antenna 44 is positioned to the right of the antenna 30, as shown, the signal received by the antenna 44 has the same phase as that transmitted by the T&R antenna 30. The received signal at antenna 44 is shown as the lower waveform in FIG. 4. The signal in the T&R antenna 42 likewise has the same phase at the transmitter pulse.

Referring to FIGS. 5 and 6, there is shown the configuration in which the antennas 42 and 44 are located to the left of the antenna 30. Referring to FIG. 6, the signal generated by the T&R antenna 30 is shown as the upper waveform. With the antennas 42 and 44 in the position shown, the signals received by these antennas are shown in the middle and lower waveforms in FIG. 6. Note that these two signals are inverted (inverse-phase) from the transmitted signal.

Referring to FIGS. 7 and 8, there is illustrated the positioning of antennas for the internal and external control apparatus so that the internal apparatus R antenna 44 is aligned with the center of the external apparatus 18 T&R antenna 30. The corresponding waveforms for the various antennas are shown in FIG. 8. The external apparatus 18 transmits a sinusoidal pulse as shown in the upper waveform in FIG. 8. Waveforms for the received signals in antennas 42 and 44 are shown in the lower two waveforms in FIG. 8. Note that with the antenna 44 aligned with the center of the antenna 30, the received waveform is at near null condition. Further note that the waveform received at antenna 44 has the same phase to that of the transmitted signal at antenna 30. The received signal at T&R antenna 42 is at a maximum amplitude and in phase with the transmitted signal at antenna 30.

Referring to FIGS. 9 and 10, this illustrates a configuration of antennas wherein the internal control apparatus 20 has its T&R antenna 42 aligned with the external control apparatus T&R antenna 30. As with the previous description, the external control apparatus transmits a pulse through the antenna 30. This pulse is shown for an example as the upper waveform in FIG. 10. The signals received in the antennas 42 and 44 are shown in the middle and lower waveforms in FIG. 10. Note that the signal in the T&R antenna 42 is in phase and at a maximum amplitude and that the signal received at the R antenna 44 has the inverse phase of that transmitted from antenna 30.

A block diagram of the external control apparatus 18, shown in FIG. 1, is illustrated in FIG. 11. The external monitor and control 18 shown in FIG. 11 is electronically the same as the control 48 for the internal control apparatus 20. The control 18 includes a microcontroller 50. A clock signal at a rate of 22 Hz is generated by the microcontroller 50 and transmitted through a line 52 and a resistor 78 to an optical coupler and transmit logic circuit 54 as well as to a x50 phase locked loop 55. The phase locked loop 55 produces an output clock signal that is at a rate 50 times greater than the clock signal received via line 52 from a microcontroller 50. This greater rate clock signal is provided to operate switched capacitor filters 56 and 57.

The control system shown in FIG. 11 is utilized by both the internal and external control apparatus. A set of control relays 58 is connected via I/O lines of the microcontroller 50 and are used for the mandrel only. A set of control input switches and status indicators 60 are connected via I/O lines of the microcontroller 50 for the bender only, the external apparatus.

An antenna head 62 includes the T&R antenna 30 and the R antenna 32 together with circuit electronic components. The T&R antenna 30 has a center tap connected to a V+ supply. A capacitor 63 is connected in parallel with the T&R antenna 30. The circuit 54 has a first output which is coupled through a resistor 64 to the base terminal of a bipolar transistor 65. The emitter of transistor 65 is connected to ground and the collector terminal is connected to a tap of the T&R coil 30. The second output of the circuit 54 is connected through a resistor 66 to the base terminal of a transistor 67 which has the emitter terminal thereof grounded. The collector terminal of transistor 67 is connected to a second tap of the T&R antenna 30.

A resistor 68 is connected between a first terminal of the T&R antenna 30 and a first input to an isolation amplifier 70. A second resistor 69 is connected between the opposite terminal of T&R antenna 30 and a second input to the isolation amplifier 70.

The output from the isolation amplifier 70 is coupled through a cable to a gain control amplifier 71, the output of which is coupled through the filter 56 to a first analog-to-digital converter port of the microcontroller 50.

The R coil 32 has each end terminal thereof connected to an amplifier 72 which has the output thereof coupled through a cable to a gain control amplifier 73. The output of amplifier 73 is coupled through the filter 57 to a second analog-to-digital (A/D) converter input port of the microcontroller 50.

The microcontroller 50 further has a transmit enable output which is coupled through a line 74 and resistor 77 to a control input of the circuit 54.

The inputs to the isolation amplifier 70 have two reverse connected diodes 75 and 76 connected between the inputs to the amplifier 70. The diodes 75 and 76 serve as blocking diodes to protect the input stage of the isolation amplifier from high voltages generated during the transmit cycle for the T&R antenna 30. The resistors 68 and 69 further provide protection for the isolation amplifier 70 during the transmit cycle.

In operation, for transmitting, the microcontroller 50 provides a transmit enable signal through line 74 to activate the circuit 54 which receives the clock signal via line 52 and produces sinusoidal pulses at a predetermined rate, as described herein, which are transmitted through the T&R antenna 30 by driving transistors 65 and 67. At the same time, the internal control apparatus has the transmit enable signal through line 74 disabled so that the T&R antenna is functioning as a receive antenna which provides a signal through the isolation amplifier 70 back to the corresponding A/D port of the microcontroller 50. Further, the R antenna 32 receives the transmitted signal and this signal is provided by the amplifier 72 back to the corresponding A/D port of the microcontroller 50. When the microcontroller 50 is in a transmitting mode, the signals at the A/D ports are disregarded. When the transmit enable signal is in the disable condition, the inputs to the A/D ports are processed. The details of the operation and processing are further described below.

Figure 12:
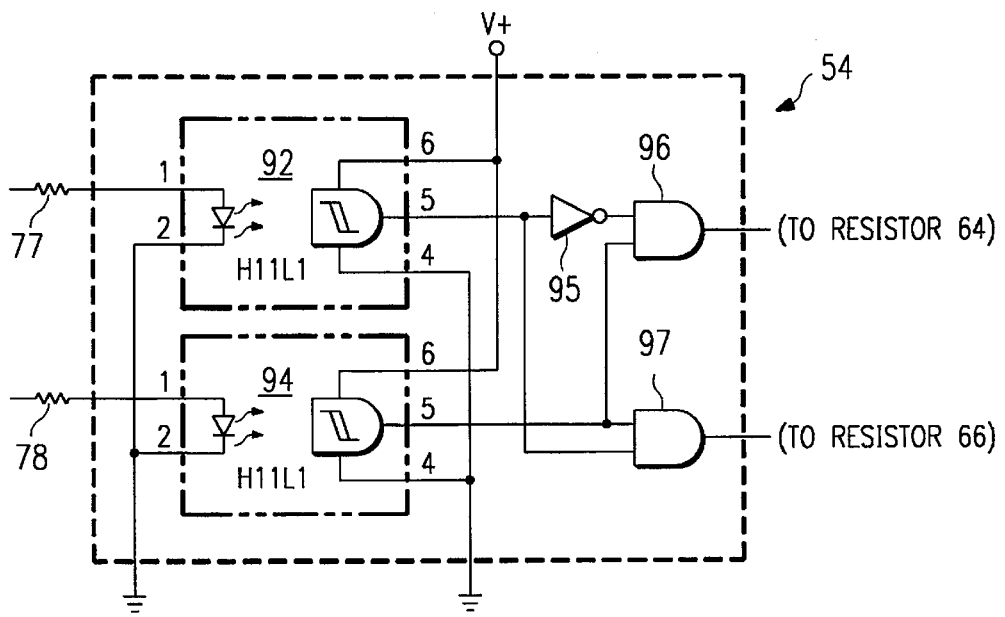
FIG. 12 is a schematic diagram of the optical coupler and transmit logic circuit shown in FIG. 11.

Referring now to FIG. 12, the transmit and optical coupler 54 has a first optical coupler 92 having a first input coupled to resistor 77 and a second terminal thereof connected to ground. The coupler 92 is further connected to receive the source voltage V+ and is also connected to ground. The output of the optical coupler 92 is connected to the input of an inverter 95 which has the output thereof connected to an AND gate 96. The output from gate 96 is connected to resistor 64. A second optical coupler 94 has the input connected to resistor 78 and further has a second terminal thereof connected to ground. The optical coupler 94 is also connected to the power source V+ and ground. The output of coupler 94 is connected to one input each of the AND gate 96 and a second AND gate 97. The output from AND gate 97 is connected to resistor 66. The output from the optical coupler 92 further provides a second input to the AND gate 97. A selected model number for the optical couplers 92 and 94 is an H11L1.

When the external control apparatus 18 is in the transmit mode, a sinusoidal pulse is transmitted at a rate that is software controlled. The internal control apparatus 20 determines the phase of the received signals and thereby determines the position of the internal mandrel 12 by the signal conditions shown in FIGS. 4, 6, 8 and 10, which correspond to the respective physical configurations shown in FIG. 3, 5, 7 and 9. For example, if the lower two waveforms shown in FIG. 4 are determined to exist by the microcontroller 50 in the internal control apparatus 20, then it is known that the antennas 42 and 44 are located to the right of the antennas 30 and 32, such as shown in FIG. 3. The microcontroller 50 then generates a signal which is transmitted via cable 27 to the drive motor of the mandrel 12 thereby commanding that the mandrel 12 be moved in the direction of arrow 14, as shown in FIG. 1.

If the lower two waveforms shown in FIG. 6 are detected by the microcontroller 50 in the internal control apparatus 20, then it is determined that the internal mandrel 12 is positioned to the left of the antennas 30 and 32. The microcontroller 50 then generates a command which is transmitted via cable 27 to the drive motor of the mandrel 12 to drive the mandrel in the direction of arrow 16, as shown in FIG. 1.

The proper positioning of the mandrel 12 within the pipeline 10 is indicated in either of the FIGS. 8 or 10. The selected alignment may be that with the antenna 44 at the center of antenna 30 or may be with the antennas 42 and 30 aligned with each other. When the desired one of these two configurations is achieved, as indicated by the lower two waveforms in FIGS. 8 and 10, then the mandrel 12 is in the desired position. By driving the mandrel from the right position past the proper alignment to the left position, the relative amplitudes of the received signals can be measured. The minimum amplitude is therefore the null condition.

Figure 13:
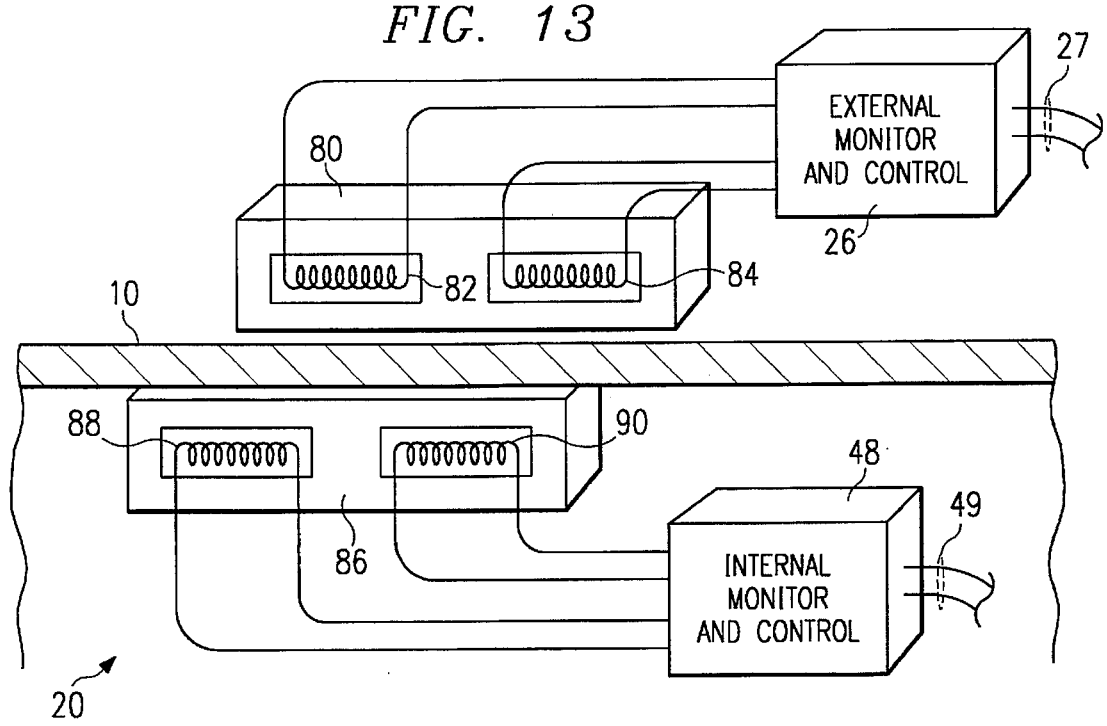
FIG. 13 is an alternative configuration of antennas for use in conjunction with the present invention.

A further embodiment of the present invention is shown in FIG. 13. In this embodiment, the antennas for both the internal and external control apparatus are positioned so that the longitudinal axis of these antennas is parallel to the axis of the pipeline 10. For the external control apparatus 18, there is provided an antenna housing 80 which includes antennas 82 and 84. Each of the antennas 82 and 84 has the same size as that described above for the external control apparatus 18, but has the orientation shown, that is, the axis of the antennas is positioned to be parallelled to that of the pipeline 10. Further, the internal control apparatus 20 has an antenna housing 86 that includes antennas 88 and 90. Each of these antennas likewise has the shape described previously for the internal control apparatus 20, but both of these antennas are positioned within the housing 86 so that they are, when in operation, parallel to the axis of the pipeline 10. A further embodiment of the present invention has each of the antennas 82, 84, 88 and 90 oriented so that each axis is perpendicular to that of the pipeline 10.

Figure 14:
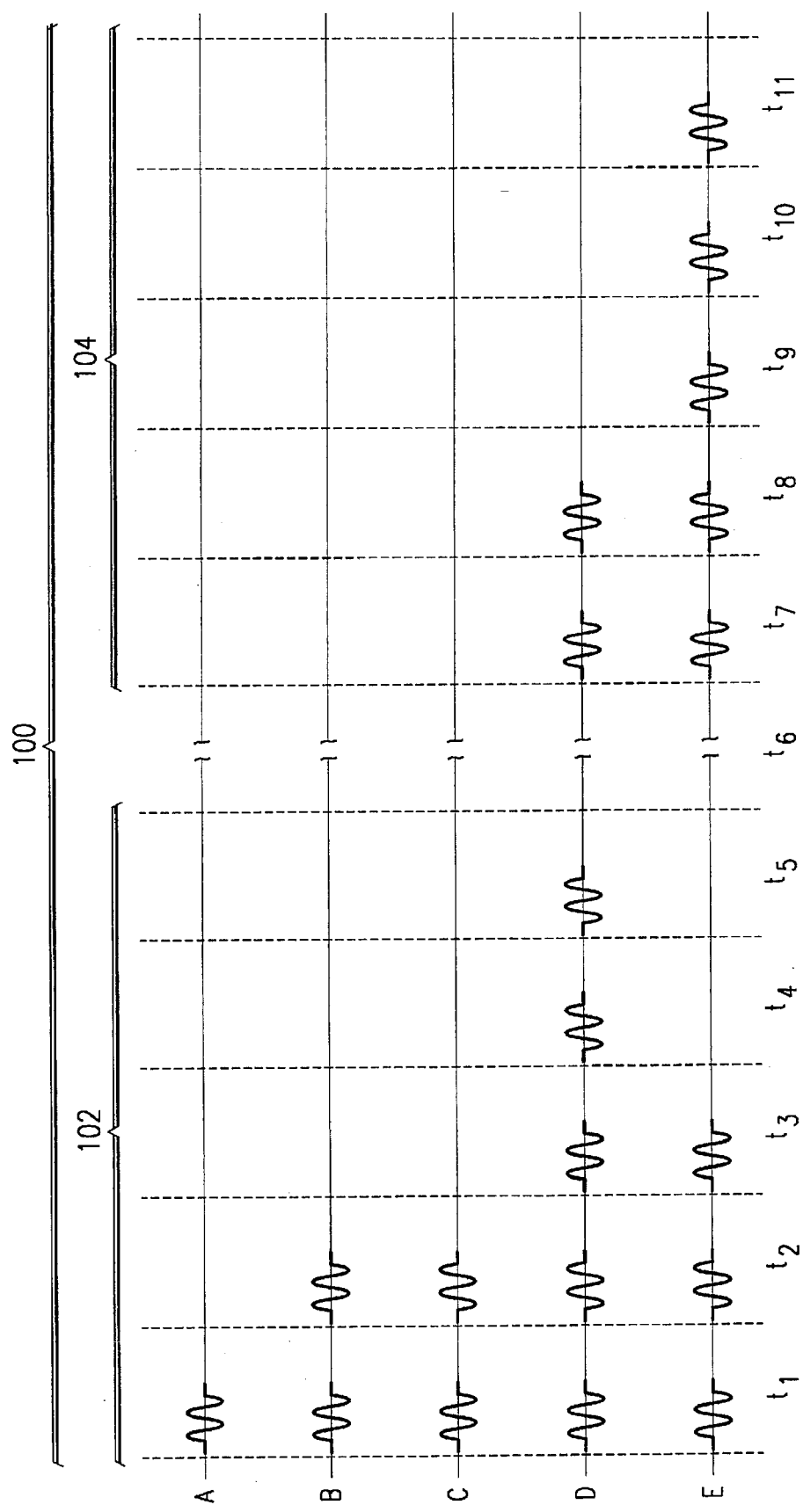
FIG. 14 is a collection of waveforms illustrating communication between the internal and external units illustrated in FIG. 2.

A further aspect of the present invention comprises the transmission of data between the external control apparatus 18 and the internal control apparatus 20. This is the data transmission mode noted above. The technique for performing this data transmission is shown in FIG. 14. A timing window 100 occurs repeatedly. The timing window 100 is subdivided into first half 102 and second half 104. During the first half 102, the external control apparatus 18 transmits and the internal control apparatus 20 receives. The halves 102 and 104 are separated by a dead time $t_6$, which has a duration of approximately 8 to 22 cycles. During the second half 104, the internal control apparatus 20 transmits and the external control apparatus 18 receives.

Each of the time segments $t_1$ through $t_5$ and $t_7$ through $t_{11}$ provides for transmission of two cycles at a rate of 22 Hz.

Further referring to FIG. 14, note that during time $t_1$ the external control apparatus 20 always transmits an in-phase signal. The timing of the window 100 is determined by the transmission of the in-phase signal by the apparatus 18 during time segment $t_1$. There are defined time segments $t_2$, $t_3$, $t_4$ and $t_5$ which constitute the data transmission portion of the window half 102. For data transmission a signal that has the same phase as the signal in time segment $t_1$ is defined to be a logic "1." A signal which has an inverse-phase to that in time segment $t_1$ is defined to be a logic "0."

The transmission of single pulse by the apparatus 18 is shown for line A. When it is desired to transmit data from the external apparatus 18 to the internal apparatus 20, a transmission such as shown in line B occurs. For line B, during time segment $t_1$, the standard in-phase signal is sent, but during time segment $t_2$, another in-phase signal is sent to indicate that a logic "1" has been transmitted. For line C, there is again transmitted during time segment $t_1$ the in-phase signal, but this is followed by an inverse-phase signal during time segment $t_2$. This indicates the transmission of a logic "0." Since there are four logic time segments available, that is time segments $t_2$, $t_3$, $t_4$ and $t_5$, as many four bits of information may be sent during one time window 102. A shown for line D, segment $t_2$ has an inverse-phase signal, segment $t_3$ has an in-phase signal, segment $t_4$ has an inverse-phase signal and segment $t_5$ has an inverse-phase signal. This would be interpreted in the internal apparatus 20 as a data logic signal "0100."

For communication between the internal apparatus 20 to the external apparatus 18, the internal apparatus always transmits an in-phase signal during the time segment $t_7$, which is the initial segment of the second half 104. This in-phase signal is shown in time segment $t_7$ for both lines D and E. For line D, the time segment $t_8$ contains an in-phase signal which indicates the transmission of a logic "1" from the internal apparatus 20 to the external apparatus 18.

In line E of FIG. 14, there is shown the transmission from the external apparatus to the internal apparatus of a logic signal "01" and in turn the transmission from the internal apparatus 20 to the external apparatus 18 of the logic signal "0100." These four bits are transmitted in the time segments $t_8$, $t_9$, $t_{10}$ and $t_{11}$.

As an example, the transmission in line D from the internal apparatus 20 to the external apparatus 18 for a single logic "1," can indicate that the mandrel has been properly positioned at a null location for the appropriate antennas and is therefore in the proper position for bending the pipe.

The bender, through the external apparatus 18, can send appropriate signals to and from the mandrel. An interchange of such signals can be as shown as follows:

| | |
|---|---|
| Step 1 | Controller: "Locate center of pipe bending die." |
| Step 2 | Mandrel: "Mandrel is centered." |
| Step 3 | Controller: "Expand the mandrel." |
| Step 4 | Mandrel: "Mandrel is expanded and is at operating pressure." |
| | (pipe bending takes place) |
| Step 5 | Controller: "Collapse mandrel." |
| Step 6 | Mandrel: "Mandrel collapsed." |
| | (repeat process starting at Step 1) |

Figure 15:
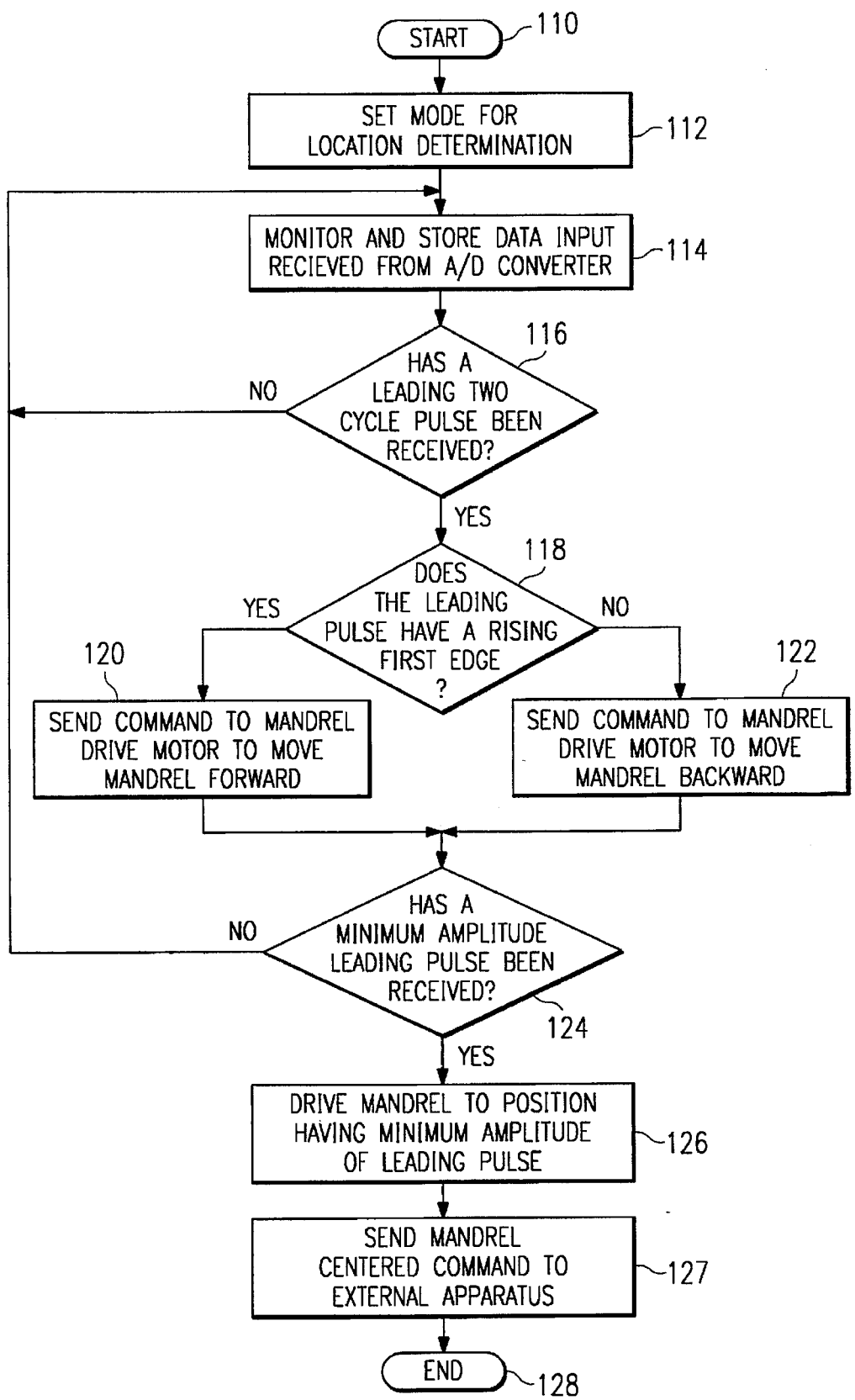
FIG. 15 is a flow diagram describing the position operation of the internal control apparatus.

The operation of the internal control apparatus to position the mandrel at the desired location is described in the flow diagram shown in FIG. 15. From a start 110, operation is transferred to a block 112 to set the mode of operation for the internal control apparatus to location determination. The internal control apparatus can perform location determination and data reception. Following the start, the microcontroller 50 receives data from its A/D converter and stores this data. This is done in block 114, and in a sequential question block 116, an inquiry is made to determine if a leading two-cycle pulse has been received from antenna 44. This is the first pulse in each of the two window halves 102 and 104. If such a pulse has not been received, control is returned to the operational block 114. If such pulse has been received, control is transferred to a question block 118.

In block 118, an inquiry is made to determine if the leading pulse has a rising first edge. If so, the microcontroller 50 sends a command to the drive motor of the mandrel to move the mandrel forward, which corresponds to the direction of arrow 14 in FIG. 1. If the leading pulse does not have a rising first edge, that is, it has a falling first edge, control is transferred to operational block 122 in which a command is sent to the mandrel drive motor to drive the mandrel backward, that is, in the direction of the arrow 16 shown in FIG. 1.

Following both operational blocks 120 and 122, control is transferred to a question block 124 to determine if a minimum amplitude leading pulse has been received. Since all the pulses being received are stored, this is an inquiry to determine if one of the pulses has a minimum amplitude compared to the pulses that were received prior to and subsequent to it. If not, control is returned to operational block 114 to receive additional pulses. If a minimum amplitude pulse has been received, control is transferred to operational block 126 in which the microcontroller 50 sends commands to position the mandrel to the position where the received pulse corresponds to the minimum amplitude leading pulse which was previously received and stored. This is the correct position for the mandrel to correspond to the longitudinal position of the transmit antenna for the external control apparatus 20.

After the completion of the operations in block 126, the microprocessor then generates a data transmission to the external control apparatus 18 to indicate that the mandrel has been properly positioned.

FIG. 16 is a flow diagram describing the process for receiving data by one of the internal or external control apparatus. Start is begun in block 140. Operational control is transferred to a block 142 to monitor and store data received from the microprocessor A/D converter. Transferring to a question block 144, a determination is made as to whether or not a leading two-cycle pulse has been received. If not, control is returned to operational block 142.

If a leading two-cycle pulse has been received in question block 144, control is transferred to an operational block 146 to determine if the leading pulse is in-phase or inverse-phase, as previously defined. Control is then transferred to a question block 148 to determine if a two-cycle pulse has been received in the first time segment. This is segment $t_2$ as shown in FIG. 14. If not, control is transferred to operational block 150 which returns to the start block 140. If a two-cycle pulse has been received in the first time segment, control is transferred to question block 152 to determine if the phase of the time segment pulse is the same as the phase as of the leading pulse. If so, control is transferred to operational block 154 to designate the first time segment pulse as a logic "1." If not, control is transferred to operational block 156 to designate the first time segment pulse as a logic "0." Following operational blocks 154 and 156, control is transferred to an operational block 158 which repeats the examination which began with question block 148 to determine whether or not a two-cycle pulse has been received in each of the sequential time segments, that is, time segments $t_3$, $t_4$ and $t_5$ and to determine whether or not each of these is a logic "1" or logic "0." When this is completed, control is returned to the start block 140.

A similar operation is carried out in the external control apparatus to determine the state of data that is transmitted during the time segments $t_8$, $t_9$, $t_{10}$ and $t_{11}$ by the internal apparatus.

In summary, the present invention is a method and apparatus for positioning equipment at a precise location within a pipeline and for providing data communication bidirectionally between equipment inside the pipeline and equipment on the outside of the pipeline.

I claim as follows:

1. A system for positioning a moveable work member within a pipe, comprising:
   a transmitter which produces a pulse signal having a principal sinusoidal component,
   a transmit antenna connected to said transmitter to transmit said pulse signal, said transmit antenna comprising a coil having an axis, said transmit antenna for positioning proximate the outer surface of said pipe,
   a receiver for mounting to said work member, and
   a receive antenna connected to said receiver, said receive antenna comprising a coil having an axis aligned perpendicular to the axis of said transmit coil, said receiver for detecting said pulse signal.

2. A system as recited in claim 1 wherein said transmit antenna is positioned parallel to the axis of said pipe.

3. A system as recited in claim 1 wherein said receiver has an output signal thereof connected to control a drive motor of said work member.

4. A system for positioning a moveable work member within a pipe, comprising:
   a transmitter which produces a pulse signal having a principal sinusoidal component, a transmit antenna connected to said transmitter to transmit said pulse signal, said transmit antenna comprising a coil having an axis, said transmit antenna for positioning proximate the outer surface of said pipe, a receiver for mounting to said work member, and a receive antenna connected to said receiver, said receive antenna comprising a coil having an axis positioned parallel to the axis of said transmit coil, said receiver for detecting said pulse signal.

5. A system for positioning a moveable work member within a pipe as recited in claim 4 wherein the axes of said antennas are aligned parallel to the axis of said pipe.

6. A method for positioning a moveable work member within a pipe, comprising the steps of:

periodically transmitting a pulse of a sinusoidal signal from an elongate, coil transmit antenna positioned proximate the exterior surface of said pipe, said transmit coil having an axis, receiving said pulse by an elongate, coil receive antenna mounted to said work member, which is within said pipe, and said receive antenna positioned proximate the inner surface of said pipe, said receive coil having an axis aligned perpendicular to the axis of said transmit coil, determining the phase of said pulse received by said receive antenna, and moving said work member within said pipe in response to the determined phase of said pulse received by said receive antenna.

7. A method for providing data communication as recited in claim 6 wherein each of said pulses comprises two cycles of a sinusoidal signal.

8. A method for positioning a moveable work member within a pipe as recited in claim 6 including the step of determining the reception of a minimum amplitude pulse by said receive antenna to establish a position for said work member for alignment of said receive antenna with said transmit antenna.

9. A method for providing data communication between an apparatus external to a pipeline and an apparatus internal to the pipeline, comprising the steps of:

periodically transmitting a reference sinusoidal pulse by a transmitter which comprises a part of said external apparatus, said pulse defining a first time window which includes a plurality of time segments, transmitting by said external apparatus transmitter during one or more of said first window time segments a data sinusoidal pulse having the same or inverse phase as that of said reference pulse, the selected phase defining a logic state for communication between said external and said internal apparatus, receiving at a receiver which comprises a part of said internal apparatus said reference sinusoidal pulse and each of said data sinusoidal pulses, and at said internal apparatus, comparing the phase of each of said received data pulses to the phase of said received reference pulse and designating the received data pulses that have the same phase as the reference pulse to have a first logic state and designating the received data pulses that have a different phase from that of the reference pulse to have a second logic state.

10. A method for providing data communication as recited in claim 9 including the steps of:

said reference pulse defining a second time window which follows said first time window, said second time window including a plurality of time segments, transmitting by a transmitter which is a part of said internal apparatus during one or more of said second window time segments a data sinusoidal pulse having the same or inverse phase as that of said reference pulse, the selected phase defining a logic state for communication between said external and said internal apparatus, receiving at a receiver, which comprises a part of said external apparatus, each of said data sinusoidal pulses in said second window, and at said external apparatus, comparing the phase of each of said received data pulses, which were transmitted during said second window, to the phase of said reference pulse and designating the received data pulses that have the same phase as the reference pulse to have a first logic state and designating the received data pulses that have a different phase from that of the reference pulse to have a second logic state.

11. A method for providing data communication as recited in claim 9 wherein each of said pulses comprises two cycles of a sinusoidal signal.

* * * * *